Dec. 3, 1935.   R. A. MacDONALD   2,022,864
MACHINE FOR SLITTING THE FACE OF NUTS
Filed March 19, 1935   4 Sheets-Sheet 1

Dec. 3, 1935.   R. A. MacDONALD   2,022,864
MACHINE FOR SLITTING THE FACE OF NUTS
Filed March 19, 1935   4 Sheets-Sheet 2

Dec. 3, 1935. R. A. MacDONALD 2,022,864
MACHINE FOR SLITTING THE FACE OF NUTS
Filed March 19, 1935 4 Sheets-Sheet 3

INVENTOR
Robert A. MacDonald
by
Harry P. Williams
Atty.

Dec. 3, 1935. R. A. MacDONALD 2,022,864
MACHINE FOR SLITTING THE FACE OF NUTS
Filed March 19, 1935 4 Sheets-Sheet 4
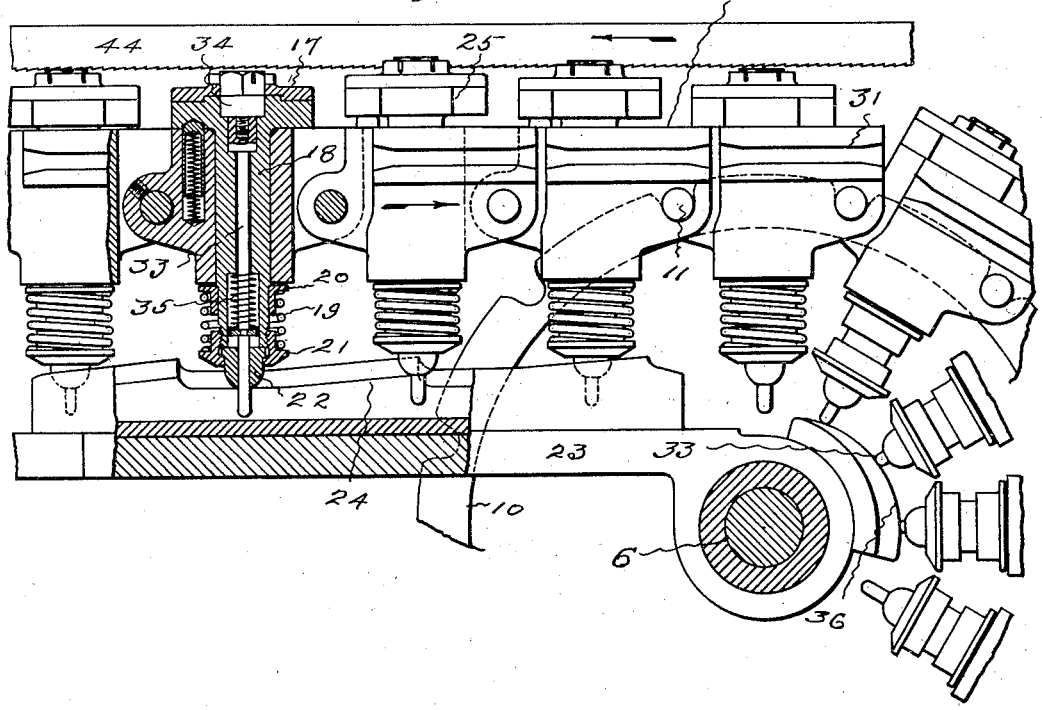
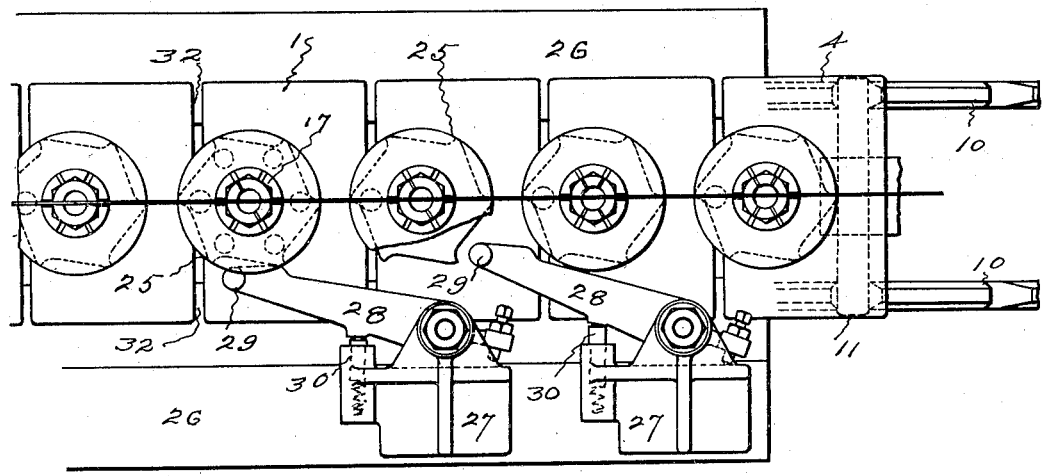
INVENTOR
Robert A. MacDonald
by Harry R. Williams
atty.

Patented Dec. 3, 1935

2,022,864

UNITED STATES PATENT OFFICE 2,022,864

MACHINE FOR SLITTING THE FACE OF NUTS

Robert A. MacDonald, Rye, N. Y., assignor to Russell, Burdsall & Ward Bolt & Nut Company, Port Chester, N. Y., a corporation of New York Application March 19, 1935, Serial No. 11,799

19 Claims. (Cl. 10—72)

This invention relates to the manufacture of nuts of the character of those illustrated and described in U. S. Patent No. 1,734,445, November 5, 1929, and more particularly to a machine designed to render yielding the outer portions of nuts in order that said outer portions will, when the nuts are tightened in place, slightly distort and bind upon the threads of the bolts and thus eliminate the necessity of using lock washers, pins or other means for preventing the nuts from loosening.

The object of the invention is to provide a relatively simple machine which will rapidly form in the outer faces of nuts radial slits of sufficient width to ensure the required yielding but without cutting away such an amount of the metal that the binding effect of the threads of the slitted portions will be rendered ineffective for preventing the nuts from loosening.

This object is attained in the embodiment of the invention illustrated by providing endless conveyors with pockets into which the nuts are fed, and from which they are ejected after they have been slitted, and carrying these pockets with the nuts past a thin endless band saw, the pockets being capable of axial and rotatory movements while carried by the conveyors so that the nuts will be intermittently engaged with the saw and between such engagements rotated for obtaining the cross slits.

In the accompanying drawings Fig. 1 shows a top view of the machine.

Fig. 4 is a side elevation on larger scale of a portion of the conveyor showing the mechanism for reciprocating the pockets to and from the slitting saw, also the means for discharging the slitted nuts.

Fig. 5 is a plan of the mechanism for turning the pockets so as to obtain the slits at the several angles.

Figure 1:
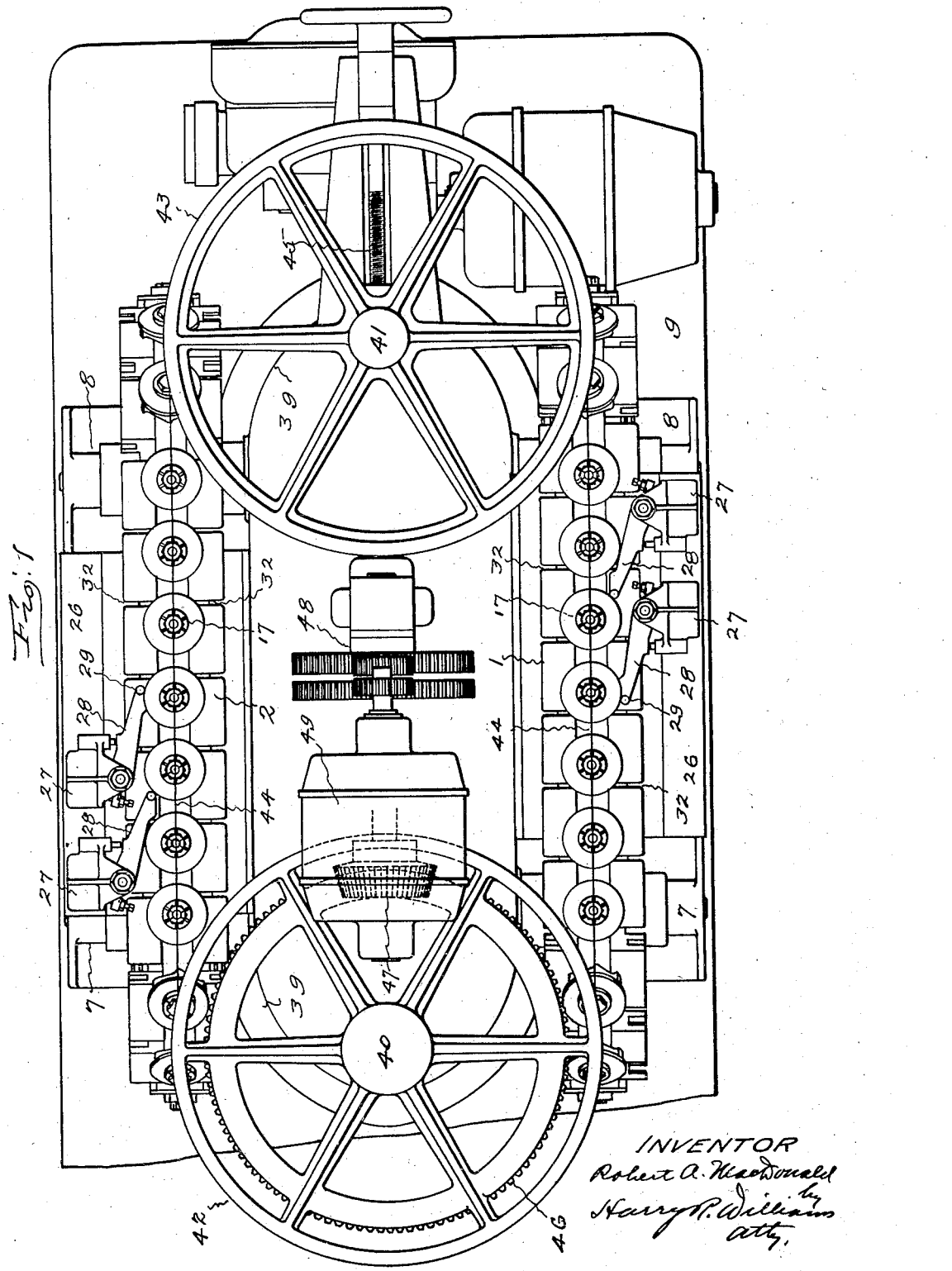

The machine illustrated has an endless conveyor chain 1 at the front and a similar chain 2 at the rear, which chains pass around idle sprocket wheels 3 and drive sprocket wheels 4, on shafts 5, 6 that are supported by bearing brackets 7, 8 mounted on the bed 9. Each of the sprocket wheels illustrated is comprised of two spaced rings 10, Fig. 3, with notched peripheries, and the hinge pins 11 of the chain links extend sidewise into the notches. Connected to the drive sprocket at the front is a bevel gear 12 and connected to the drive sprocket at the rear is a bevel gear 13 and meshing with these gears is a bevel pinion 14, on a shaft 15 that is driven from a motor 16, Figs. 2, 3. By this means the conveyor chain in front is given a continuous travel in one direction and the conveyor chain in the rear is given a continuous travel in the opposite direction.

Each link of the conveyor chains carries a pocket 17 which in its outer face has a socket shaped to receive a nut. Each pocket has a stem 18 that fits but is freely movable rotatably and axially in an opening through the conveyor link. The pocket head is normally held against the outer face of the link by a spring 19 that encircles the inner end of the stem between collars 20 and 21, the former being loose on the stem and the latter adjustably attached thereto. Held against the inner end of the stem by the collar 21 is a button 22, Fig. 4.

Figure 2:
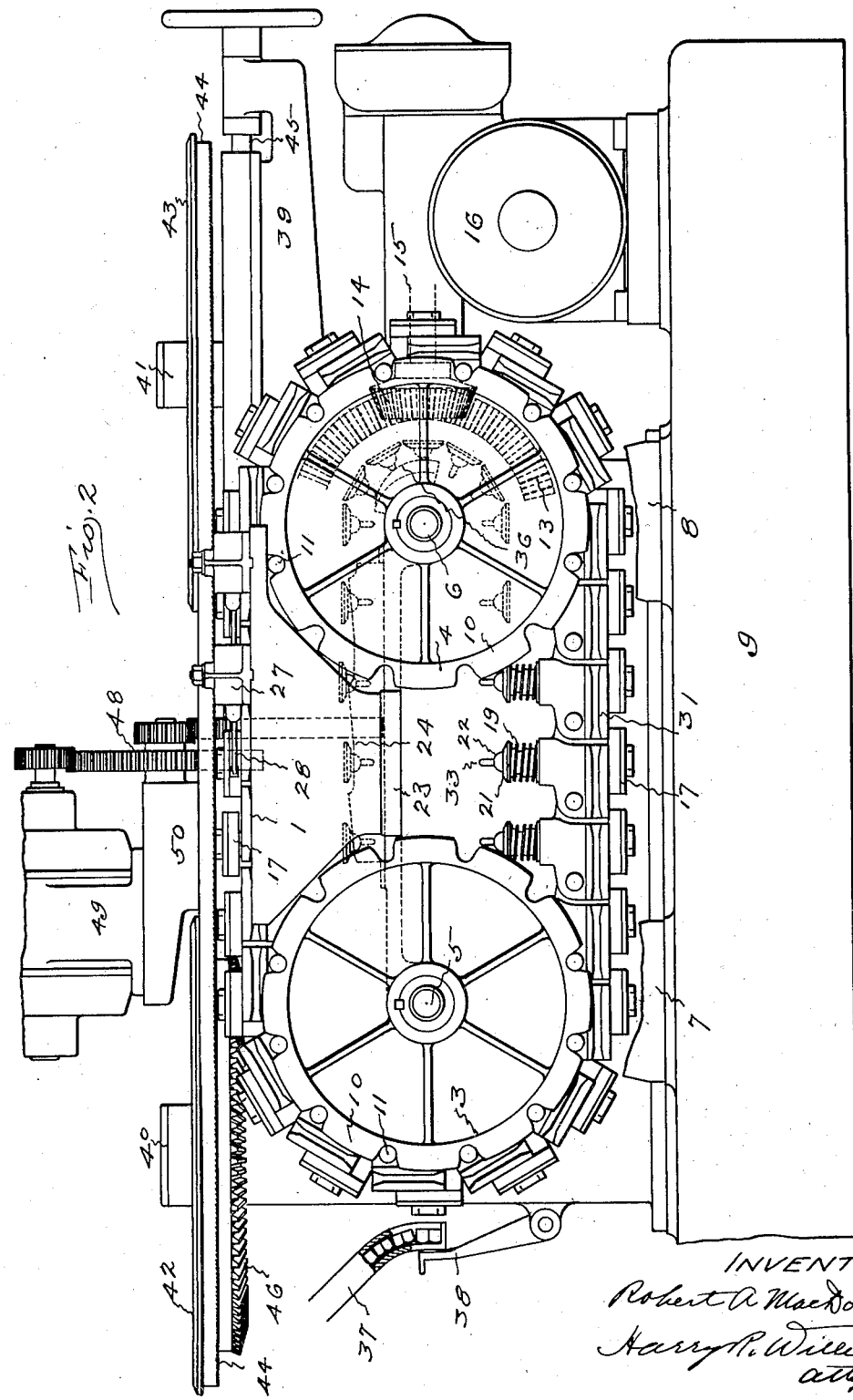
Fig. 2 is a front elevation.

Yokes 23 are mounted on and extend between the shafts 5 and 6 and on these yokes in the paths of the pocket stems are three inclines 24 which, as the conveyor chains travel are engaged by the buttons at the ends of the pocket stems so that periodically by this means the pockets will be pushed axially out from the chain links, Figs. 2, 4.

The periphery of the head at the outer end of each pocket is notched to provide six ratchet teeth 25. Mounted on the frame bars 26 outside of the chains are brackets 27 to which are pivoted fingers 28, the free ends of which extend toward the chains and are provided with studs 29. Spring plungers 30 tend to press these fingers into such position that as a link passes a finger its stud will engage with a tooth on the periphery of a pocket and cause the pocket to rotate 60°, Fig. 5. The brackets are so located that the fingers will give each pocket a turn following its outward and inward movement caused by an incline 24 and spring 19.

In the outer edges of the links are grooves 31 into which plates 32 fixed to the bars 26 enter as the links pass the localities where the pockets are lifted so that the pockets may be pushed out without distorting the chains.

Extending through the stems 18 and buttons 22 are spindles 33 with heads 34 at the bottom of the nut sockets. Springs 35 tend to draw these spindles inward. Fixed on the ends of the yokes 23 are cams 36. As a pocket carried by a conveyor chain reaches the locality of one of these cams the inner end of its spindle 33 engages the cam and riding upon it causes the spindle head 34 to eject the nut that is in the pocket, Fig. 4. The inclines 24 which project the pockets are grooved, as shown in Figs. 3 and 4, so that the passage of the inner ends of the ejecting spindles is not obstructed.

The nuts may be fed in succession to the conveyor pockets by any suitable means located at the end of the machine opposite that from which the nuts are discharged. The nuts may be passed from a chute 37 to the pockets by a lever 38 or other means actuated by any convenient means. As the feed mechanism forms no part of the present invention it is not illustrated and described in detail.

Supported by a frame 39 near one end of the machine is a vertical shaft 40 and near the other end a vertical shaft 41. Attached to the former shaft is a pulley 42 and to the latter shaft a pulley 43. Around these pulleys passes a thin endless band saw 44. The distance apart of these pulleys may be adjusted for obtaining the desired tension of the saw by the screw 45, Fig. 1.

Figure 3:
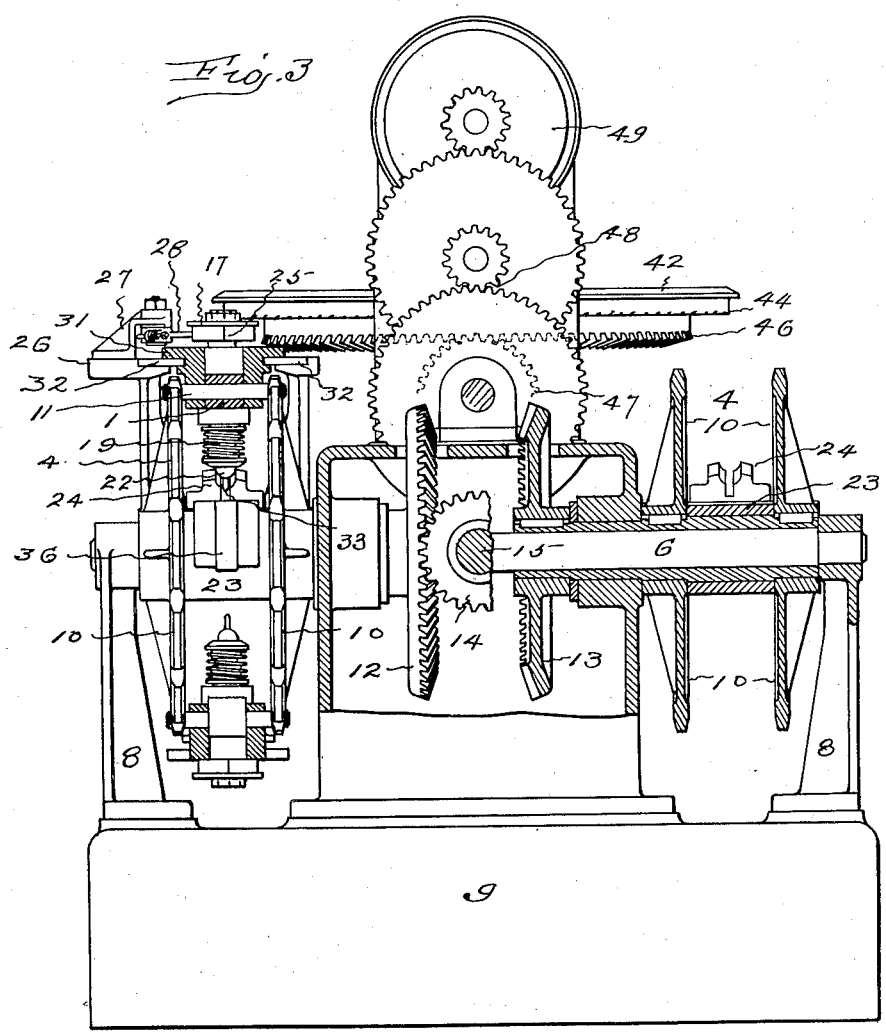
Fig. 3 is a view looking at the discharge end of the machine with parts cut away to disclose features of the construction.

Fastened to the under side of the pulley 42 is a bevel gear 46 engaged with which is a pinion 47 that is driven through intermeshing gears 48 from a motor 49 which is supported by a bracket 50 mounted on the top of the frame, Figs. 1, 3.

In this machine the nuts are successively fed into the chain pockets and are carried by the pockets beneath the rapidly running band saw. The saw section at the front runs in one direction and the saw section at the rear runs in the opposite direction. The nut carrying pockets in front travel in a direction opposite to that of the front section of the saw and the nut carrying pockets in the rear travel in a direction opposite to that of the rear section of the saw. As a pocket reaches an incline it is lifted so that the nut which it carries is engaged with the saw and a slit is cut in its outer face. After the inner end of the pocket stem drops off of the first incline the advance of the chain causes a pocket ratchet tooth to be engaged by one of the fingers and the pocket to be given a 60° turn. The pocket is then pushed out by the second incline and the nut again carried into engagement with the saw and a slit cut across its face at 60° from the slit previously cut. As the chain travel continues the pocket is rotated another 60° and then moved out so that the nut will be engaged with the saw and another slit cut across its face.

By the employment of a rapidly running band saw very thin slits may be quickly cut across the faces of the nuts at angles to each other without removing so much metal as to destroy the binding effect of the slitted threads. As the nuts are carried up to the saws by inclines they are gradually presented in such manner that the slits are formed with a clean cut. With a continuously running saw and continuously traveling conveyor and nuts slitted simultaneously at both the front and rear the output of the machine is large.

The drawings show and the description has been confined to the slitting of the faces of hexagonal nuts. The invention, however, is not limited, as is obvious, to the slitting of the faces of hexagonal nuts. Nuts of various shapes and sizes can be slitted by merely changing the conformation of the pockets into which the nuts are fed. Nuts of one size or shape may be slitted at the front and nuts of a different size or shape may be slitted at the rear, at the same time.

Electric motors are shown for driving the conveyor chains and the band saw but it is obvious that other driving means for these elements may be used if desired. The invention is applicable to the manufacture of the ordinary commercial slotted or castellated nuts, for which nuts, however, the band saw would necessarily be somewhat thicker and the pulleys 42 and 43 relatively larger in diameter than for cutting thin slots.

The invention claimed is:—

1. A nut slitting machine comprising a conveyor having pockets for receiving nuts, means for moving the conveyor, a saw with its teeth movable parallel with and adjacent to a portion of the path of the conveyor pockets, means for moving the pockets intermittently toward and from the saw, and means for intermittently giving an angular movement to the pockets with relation to the saw.

2. A nut slitting machine comprising an endless conveyor having pockets for receiving nuts, means for moving the conveyor, a saw with its teeth movable parallel with and adjacent to a portion of the path of the conveyor pockets, means for moving the pockets intermittently toward and from the saw, and means for intermittently giving an angular movement to the pockets with relation to the saw.

3. A nut slitting machine comprising an endless conveyor having pockets for receiving nuts, means for giving the conveyor a continuous movement, a saw with its teeth movable parallel with and adjacent to a portion of the path of the conveyor pockets, means for moving the pockets intermittently toward and from the saw, and means for intermittently giving an angular movement to the pockets with relation to the saw.

4. A nut slitting machine comprising an endless conveyor having pockets for receiving nuts, means for giving the conveyor a continuous movement, an endless saw with its teeth movable parallel with and adjacent to a portion of the path of the conveyor pockets, means for giving the saw a continuous movement, means for moving the pockets intermittently toward and from the saw, and means for intermittently giving an angular movement to the pockets with relation to the saw.

5. A nut slitting machine comprising a conveyor having pockets for receiving nuts, means for moving the conveyor, an endless band saw with its teeth movable parallel with and adjacent to a porton of the path of the conveyor pockets, and means for alternately reciprocating the pockets with relation to the saw.

6. A nut slittting machine comprising a conveyor having pockets for receiving nuts, means for moving the conveyor, a saw with its teeth movable parallel with and adjacent to a portion of the path of the conveyor pockets, means for moving the pockets intermittently toward and from the saw, means for intermittently giving an angular movement to the pockets with relation to the saw, and means for ejecting nuts from the pockets.

7. A nut slitting machine comprising an endless conveyor having pockets for receiving nuts, means for moving the conveyor, an endless saw with its teeth movable parallel with and adjacent to a portion of the path of the conveyor pockets, and means for moving the pockets intermittently toward and from the saw.

8. A nut slitting machine comprising an endless conveyor having pockets for receiving nuts, means for moving the conveyor, means for reciprocating the pockets transversely of the conveyor movements an endless saw with its teeth movable parallel with and adjacent to a portion of the path of the conveyor pockets, and means for intermittently giving an angular movement to the pockets with relation to the saw.

9. A nut slitting machine comprising an endless conveyor having pockets for receiving nuts, means for moving the conveyor, an endless saw with its teeth movable parallel with and adjacent to a portion of the path of the conveyor pockets, means for reciprocating the pockets toward and from the saw, and means for rotating the pockets.

10. A nut slitting machine comprising an endless conveyor having pockets for receiving nuts, means for moving the conveyor, an endless saw with its teeth movable parallel with and adjacent to a portion of the path of the conveyor pockets, fixed means for periodically reciprocating the pockets toward and from the saw, and fixed means for periodically rotating the pockets.

11. A nut slitting machine comprising an endless conveyor having pockets for receiving nuts, means for moving the conveyor, a saw with its teeth movable parallel with and adjacent to a portion of the path of the conveyor pockets, and fixed inclines engaged by portions of the pockets as they are carried by the conveyor for moving the pockets toward the saw.

12. A nut slitting machine comprising an endless conveyor having pockets for receiving nuts, means for moving the conveyor, means for reciprocating the pockets transversely of the conveyor movements, a saw with its teeth movable parallel with and adjacent to a portion of the path of the conveyor pockets, said pockets having peripheral ratchet teeth, and fingers adapted to engage the ratchet teeth and turn the pockets as the pockets are advanced by the conveyor.

13. A nut slitting machine comprising an endless conveyor having pockets for receiving nuts, said pockets having peripheral ratchet teeth, means for moving the conveyor, an endless saw with its teeth movable parallel with and adjacent to a portion of the path of the conveyor pockets, fixed inclines engaged by portions of the pockets as they are carried by the conveyor for moving the pockets toward the saw, and fingers adapted to engage said ratchet teeth and turn the pockets as they are carried by the conveyor.

14. A nut slitting machine comprising an endless conveyor having pockets for receiving nuts, said pockets having peripheral ratchet teeth and ejecting means, means for moving the conveyor, an endless saw with its teeth movable parallel with and adjacent to a portion of the path of the conveyor pockets, fixed inclines engaged by portions of the pockets as they are carried by the conveyor for moving the pockets toward the saw, fingers adapted to engage said ratchet teeth and turn the pockets as they are carried by the conveyor, and a cam adapted to be engaged by the said ejecting means as the pockets are carried by the conveyor.

15. A nut slitting machine comprising an endless traveling conveyor having pockets for receiving nuts, an endless saw with its teeth movable parallel with and adjacent to a portion of the path of the conveyor pockets, and means for periodically and alternately reciprocating the pockets toward and from saw teeth and rotating said pockets with relation to the path of the saw teeth.

16. A nut slitting machine comprising a pair of endless conveyors said conveyors traveling parallel with each other in opposite directions and carrying pockets for receiving nuts, an endless saw with its teeth on one section moving parallel with and adjacent to a portion of the path of the pockets of one conveyor and its teeth on another section movable parallel with and adjacent to a portion of the path of the pockets of the other conveyor, means for reciprocating said pockets toward and from the saw, and means for rotating said pockets angularly with relation to said saw.

17. A nut slitting machine comprising a band saw, means for carrying nuts and presenting them to opposite sections of said saw, said means presenting each nut a plurality of times to the same section of the saw and means for rotating the nuts between the periods at which they are presented to the saw.

18. A nut slitting machine comprising a band saw, means for intermittently and simultaneously presenting the end faces of a plurality of nuts to said saw, and means for giving the nuts an angular movement between each presentation of the nuts to the saw.

19. The method of treating nuts which comprises intermittently presenting the end faces of the nuts to the action of continuously moving teeth of a band saw, and giving the nuts a transverse also an angular movement between each presentation of the nuts to said saw teeth.

ROBERT A. MacDONALD.